Patented Apr. 12, 1949

2,467,123

UNITED STATES PATENT OFFICE 2,467,123

PROCESS FOR THE REMOVAL OF HYDROGEN HALIDE FROM HALOGENATED COMPOUNDS

Elmer E. Fleck, Silver Spring, Md., and Herbert L. J. Haller, Washington, D. C., assignors to United States of America as represented by the Secretary of Agriculture No Drawing. Application May 18, 1944, Serial No. 536,226

2 Claims. (Cl. 260—649)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to a process for the catalytic removal of hydrogen halides from halogenated aliphatic hydrocarbons and from the side chains of araliphatic hydrocarbons containing halogen substituents in the aliphatic side chains.

The dehydrohalogenation of organic compounds by means of alkali is a well known general reaction which has been applied in splitting hydrogen halide from a wide variety of halogenated organic compounds to produce numerous unsaturated organic compounds. The reaction has been applied in making ethylene from ethyl bromide, 1-chloropropylene from propylidene chloride, allylene from 1-bromopropylene, cyclohexane from cyclohexyl chloride, and so forth.

A common characteristic of the organic reactants for such reactions is that they each contain in a non-aromatic (i.e., an aliphatic or alicyclic) portion of the molecule the radical

wherein X represents halogen.

The reaction has usually been carried out by heating the organic reactant with a solution of KOH in ethanol. Other caustics such as NaOH and other solvents such as water and polyhydric alcohols have been used. In these reactions the hydrogen halide reacts with the caustic to form salts which must be removed from the reaction mass. Likewise, it is necessary to separate the desired dehydrohalogenated compound from the solvents used.

We have now discovered that ferric chloride, preferably anhydrous ferric chloride, and certain other catalysts will cause the hydrogen halide to separate from the halogenated compound when heated under anhydrous conditions leaving the unsaturated compound in a relatively pure condition. When the unsaturated compound has a relatively high boiling point, the hydrogen halide may be driven off as a gas; otherwise, it may be removed by absorption in water or some other suitable solvent. The reaction proceeds without the aid of a caustic and results in the formation of dry hydrogen halide as a valuable by-product instead of the much less valuable halide salt. The reaction may be carried out without the use of a solvent, although it is preferable that the halogenated compound be in the liquid state when in contact with the catalyst. The reaction may also be carried out with the halogenated compound in the gaseous state, or with the halogenated compound dissolved in an inert hydrocarbon solvent, nitrobenzene, chlorinated benzene, cyclohexanone and other ketones.

The temperature at which the reaction may be carried out varies with the nature of the halogenated organic compound. In general, the temperature is held as low as possible. The reaction is speeded up by higher temperatures and the top temperature is limited by the point where decomposition of the molecule as a whole takes place.

While anhydrous ferric chloride is the preferred catalyst, other catalysts including other anhydrous iron halides will also cause this dehydrohalogenation to take place. The relative effectiveness of some of these catalysts is shown in the table.

Table

[2 g. p-dichlorodiphenyltrichlorethane + 2 g. catalyst heated for one hour at 115°–120° C.]

| Catalyst | Mols. HCl given off |
|---|---|
| Anhydrous FeCl$_3$ (0.1 g. of catalyst used) | 1.0 |
| AlCl$_3$ (anhydrous) (0.1 g. of catalyst used) | 0.7 |
| Fe$_2$O$_3$ c. p. | 0.3 |
| Iron filings, fine | 1.0 |
| FeCl$_3$ . 6H$_2$O | 0.9 |
| FeCl$_3$ . 6H$_2$O (alone) | 0.4 |
| Rust | 0.7 |
| Pyrax ABB, Sample I | 1.0 |
| Pyrax ABB, Sample II | 0.0 |
| Talc U. S. P. | 0.0 |
| Talc (off color) | 1.0 |
| Fuller's earth | 1.0 |
| Bentonite | 0.3 |
| Kaolin | 1.0 |
| Carbex E | 0.4 |
| Norite | 0.2 |
| CuCl$_2$ | 0.1 |

The catalyst may be used alone or supported on a carrier such as silica, alumina, and so forth. The amount of catalyst may range within wide limits. For example, 0.05 percent of anhydrous ferric chloride will remove 1 mol. of hydrochloric acid from p-dichlorodiphenyltrichlorethane in the course of 15 minutes at 115°–120° C. If 5 percent of the catalyst is used, the reaction is completed with the melting of the p-dichlorodiphenyltrichlorethane.

Our invention is illustrated by the following examples:

Example I

The catalyst is prepared by placing 0.1 g. of fine iron filings or iron powder in a 250 cc. Erlenmeyer flask. A slow current of $Cl_2$ is passed over the iron and the bottom of the flask is warmed with a free flame until sparking occurs. The flask is cooled and then freed of excess chlorine with a current of dry air. The p-dichlorodiphenyltrichlorethane (100 g.) is added and an outlet for the HCl gas is fitted to the flask and connected to an HCl absorber. The flask is then heated in an oil bath maintained at a temperature between 115°–120° C. Gas evolution takes place as soon as the material melts and the reaction is completed in about 30 minutes.

The product remaining in the flask is p-dichlorodiphenyldichlorethylene, and the yield is quantitative. This product may be separated from the catalyst by filtration while hot.

Example II

The catalyst was prepared as in Example I, and 100 g. of 2,2-diphenyl-1,1,1-trichlorethane was heated with 0.1 g. of the catalyst as outlined in Example I. A quantitative yield of 2,2-diphenyl-1,1-dichlorethylene was obtained.

Example III 100 g. of 2-p-chloro-2-phenyl-1,1,1-trichlorethane was reacted as described in Example I. A quantitative yield of 2-p-chloro-2-phenyl-1,1-dichlorethylene was obtained.

Example IV

The catalyst was prepared as in Example I from 0.1 g. iron filings, and was placed in a glass U-tube with 2 g. of chlorocyclohexane. A current of dry air was drawn through the U-tube and then through an absorption flask containing 75 cc. of water, the U-tube was heated in an oil bath at 110°–120° C. for one hour. The aqueous solution in the absorber was then titrated. 20 cc. of N/10 sodium hydroxide was required to neutralize the hydrochloric acid that was absorbed in the water.

Example V

A mixture of 2 g. of p-dichlorodiphenyltrichlorethane and 2 g. of anhydrous ferric bromide was placed in a glass U-tube and heated as in Example IV. The aqueous solution in the absorber was then titrated and it required 65 cc. of N/10 sodium hydroxide to neutralize the acid present.

Example VI

The procedure of Example V was repeated with 0.1 g. of catalyst and 2 g. of alpha,beta-dibromostyrene at a temperature of 100°–105°. 70 cc. of N/10 sodium hydroxide was required to neutralize the HBr collected in the water absorber.

Example VIII

Example VI was repeated using alpha, beta-dichlorostyrene. After heating for one hour, 64 cc. of N/10 sodium hydroxide was required to neutralize the HCl given off.

Having thus described our invention, we claim:

1. A process of removing hydrogen halide from the molecule of halogenated hydrocarbons selected from the group consisting of halogenated aliphatic hydrocarbons and araliphatic hydrocarbons containing halogen substituents in the aliphatic side chains, which comprise heating in the liquid state under anhydrous conditions the halogenated hydrocarbon with a catalytic amount of anhydrous ferric chloride.

2. The process of claim 1 wherein the halogenated hydrocarbon is p-dichlorodiphenyltrichlorethane.

ELMER E. FLECK.
HERBERT L. J. HALLER.

REFERENCES CITED

The following references are of record in the file of this patent:

UNITED STATES PATENTS

| Number | Name | Date |
|---|---|---|
| 2,084,937 | Britton et al. | June 22, 1937 |
| 2,134,102 | Cass | Oct. 25, 1938 |

FOREIGN PATENTS

| Number | Country | Date |
|---|---|---|
| 559,737 | Germany | Sept. 23, 1932 |

OTHER REFERENCES

Thomas: "Anhydrous Aluminum Chloride in Organic Chemistry," pages 779–80, 867–8.

Brand et al.: "Ber. der. deut. Chem. Gesell," vol. 72, page 1032 (1939).